(12) United States Patent
Hayase et al.

(10) Patent No.: US 9,220,955 B2
(45) Date of Patent: Dec. 29, 2015

(54) GOLF CLUB HEAD AND METHOD FOR MANUFACTURING THE SAME

(71) Applicant: DUNLOP SPORTS CO. LTD., Kobe-shi (JP)

(72) Inventors: Seiji Hayase, Kobe (JP); Masahide Onuki, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 232 days.

(21) Appl. No.: 13/905,240

(22) Filed: May 30, 2013

(65) Prior Publication Data

US 2013/0324305 A1    Dec. 5, 2013

(30) Foreign Application Priority Data

May 31, 2012    (JP) .................................. 2012-125259

(51) Int. Cl.
*A63B 53/04*    (2015.01)
*B29C 65/16*    (2006.01)
*B32B 37/06*    (2006.01)

(52) U.S. Cl.
CPC ............. *A63B 53/0466* (2013.01); *A63B 53/04* (2013.01); *A63B 53/047* (2013.01); *A63B 2053/0437* (2013.01); *A63B 2209/00* (2013.01); *A63B 2209/023* (2013.01); *B29C 65/16* (2013.01); *B32B 37/06* (2013.01); *Y10T 156/10* (2015.01)

(58) Field of Classification Search
CPC .................. A63B 53/0466; A63B 2053/0437; A63B 2209/023; A63B 2209/00; A63B 53/04; A63B 53/047; Y10T 156/10; B29C 65/16; B32B 37/06
USPC ............ 473/324–350, 287–292, 409; 156/60, 156/272.8
See application file for complete search history.

(56) References Cited

U.S. PATENT DOCUMENTS

| | | | | |
|---|---|---|---|---|
| 6,059,669 | A * | 5/2000 | Pearce ......................... | 473/339 |
| 6,871,626 | B2 * | 3/2005 | Kamiyama et al. ........ | 123/195 C |
| 7,128,662 | B2 * | 10/2006 | Kumamoto ................... | 473/345 |
| 7,128,664 | B2 * | 10/2006 | Onoda et al. .................. | 473/347 |
| 7,214,142 | B2 * | 5/2007 | Meyer et al. .................. | 473/332 |
| 7,252,599 | B2 * | 8/2007 | Hasegawa ..................... | 473/329 |
| 2005/0082265 | A1 * | 4/2005 | Yamabuki et al. ........ | 219/121.64 |
| 2007/0105657 | A1 | 5/2007 | Hirano | |
| 2007/0202963 | A1 | 8/2007 | Oyama | |
| 2009/0237774 | A1 * | 9/2009 | Ito et al. ........................ | 359/296 |
| 2011/0139353 | A1 * | 6/2011 | Sugiyama et al. ............ | 156/212 |

FOREIGN PATENT DOCUMENTS

| JP | 2007-125242 A | 5/2007 |
|---|---|---|
| JP | 2007-229002 A | 9/2007 |
| JP | 2009-183620 A | 8/2009 |

* cited by examiner

*Primary Examiner* — Sebastiano Passaniti
(74) *Attorney, Agent, or Firm* — Birch, Stewart, Kolasch & Birch, LLP

(57) ABSTRACT

A golf club head comprises a metal member made of at least one kind of metal material and a resin member made of a resin material welded to the metal member. A method for manufacturing the golf club head comprises a step of welding the resin member to the metal member.

14 Claims, 10 Drawing Sheets

GOLF CLUB HEAD AND METHOD FOR MANUFACTURING THE SAME

BACKGROUND OF THE INVENTION

The present invention relates to a golf club head having a hollow structure comprising a metal member and a resin member and a method for manufacturing the same, more particularly to a welding technique for joining a resin member and a metal member without using an adhesive agent.

In recent years, a golf club head having a hollow structure manufactured by joining two or more members has been proposed.

The following patent document 1 discloses a metal golf club head formed by welding a head main body made of a metal material and provided in a crown portion with an opening, and a crown member made of a metal material and covering the opening.

The following patent documents 2 and 3 each disclose a hybrid golf club head comprising a head main body made of a metal material and provided in a crown portion with an opening, and a crown member made of a resin material and fixed to the head main body by means of an adhesive agent so as to cover the opening.

In the golf club head disclosed in the patent document 1, all of the members are made of metal materials, therefore, the total mass of the club head tends to increase, and it is difficult to increase the volume of the head within a limited range of the total mass.

In the hybrid golf club heads disclosed in the patent documents 2 and 3, owing to the crown member made of a relatively light resin material, the total mass of the club head may be reduced. But, the bonding strength between the crown member and the head main body tends to become relatively low due to the adhesive agent. Thus, there is a problem with the durability.

Patent document 1: Japanese Patent Application Publication No. 2007-125242
Patent document 2: Japanese Patent Application Publication No. 2007-229002
Patent document 3: Japanese Patent Application Publication No. 2009-183620

SUMMARY OF THE INVENTION

It is therefore, an object of the present invention to provide a golf club head and a method for manufacturing the same, in which the bonding strength between a metal member and a resin member is increased to improve the durability of the head.

According to the present invention, a golf club head comprises a metal member made of at least one kind of metal material and a resin member made of a resin material which are joined by means of welding.

According to the present invention, a method for manufacturing the golf club head comprises a step of welding the resin member and the metal member.

Therefore, during welding the resin member to the metal member, a part of the resin member is pyrolytically decomposed and bubbles are caused in the molten part. The bubbles force the molten resin to flow along the surface of the metal member, thus the molten resin closely contacts with the metal member. As a result, a strong interfacial bond on a nano-scale or atomic-scale is provided between the metal member and the resin member. Usually, such interfacial bond has a strength corresponding to the shear strength of the resin itself. Accordingly, in the golf club head according to the present invention, the joint between the metal member and the resin member has a high bonding strength and high durability. Further, it is not necessary to use an adhesive agent to connect the resin member to the metal member, therefore, the emission of a volatile organic compound usually contained in the adhesive agent can be prevented. Further, a quick bonding is possible. Thus, the production efficiency may be improved.

The golf club head and the method according to the present invention may include the following features (1)-(9):
(1) The resin material is a thermoplastic resin.
(2) The golf club head has a hollow structure, the metal member is provided with an opening in its crown portion forming an upper surface of the club head, and the resin member closes the opening.
(3) The resin member is reinforced with fibers.
(4) In a weld joint between the metal member and the resin member, their edge portions are overlapped one upon the other.
(5) In a weld joint between the metal member and the resin member, their edge faces are butted with each other.
(6) one of the edge faces of the metal member and the resin member is provided with a depression and the other is provided with a projection fitting into the depression.
(7) In a cross section of the weld joint, the butted edge faces extend in the thickness direction of the weld joint or are inclined with respect to the thickness direction of the weld joint or extend zigzag.
(8) The welding is achieved by irradiating the metal member with a laser beam through the resin material.
(9) The welding is achieved by irradiating the metal member with a laser beam not through the resin material.

DESCRIPTION OF THE PREFERRED EMBODIMENTS

Figure 1:
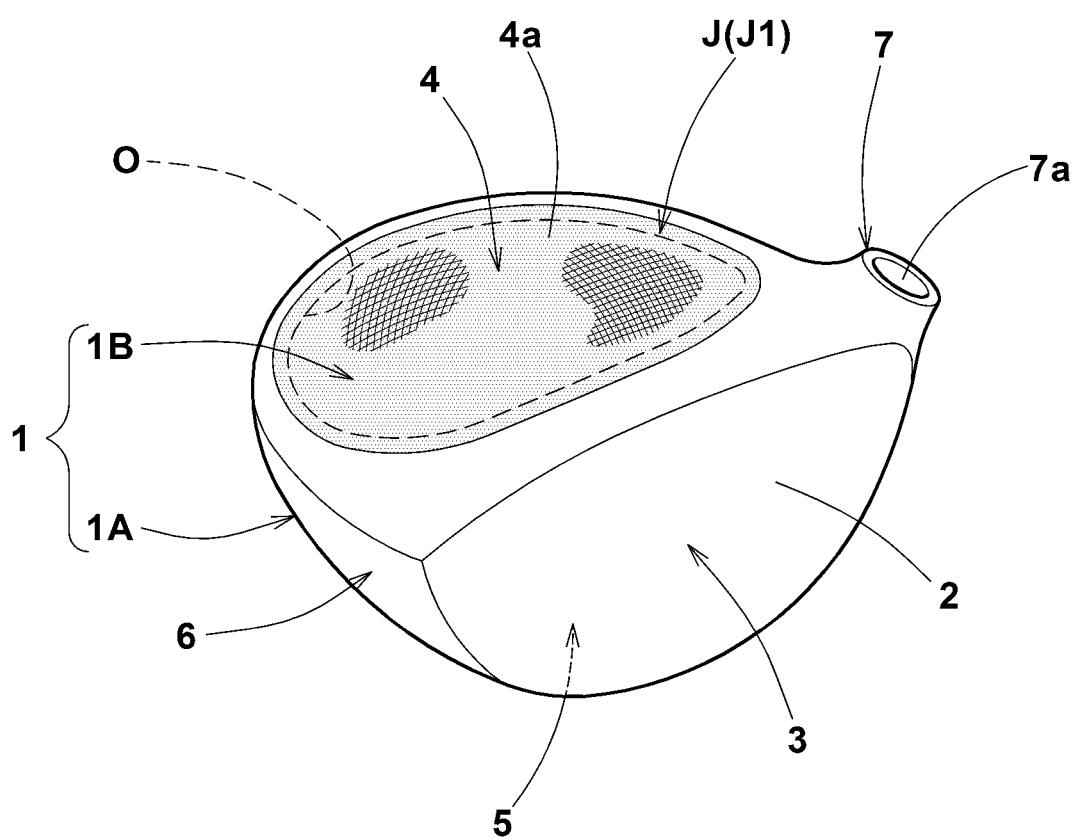
FIG. 1 is a perspective view of a golf club head as an embodiment of the present invention.

Embodiments of the present invention will now be described in detail in conjunction with accompanying drawings.

According to the present invention, the golf club head 1 is composed of a metal member 1A made of at least one kind of metal material and a resin member 1B made of a resin material.

In the drawings, each club head 1 according to the present invention has a hollow structure with a hollow (i) therein designed for a wood-type golf club such as driver (#1), fairway wood or the like.

The golf club head 1 comprises a face portion 3 having a club face 2 for striking a ball, a crown portion 4 forming an upper surface of the club head, a sole portion 5 forming a bottom face of the club head, a side portion 6 between the crown portion 4 and the sole portion 5, and a hosel portion 7 provided with a shaft inserting hole 7a into which a shaft (not shown) is inserted.

In the case of a wood-type golf club head 1, the volume of the head is preferably not less than 360 cc, more preferably not less than 380 cc in order to increase a moment of inertia of the head and deepen the center of gravity of the head. But, in order to avoid an unfavorable increase in the head weight and to comply with golf rules, the volume of the head is preferably not more than 470 cc, more preferably not more than 460 cc. Further, in view of the swing balance, the weight of the head is preferably not less than 170 g, more preferably not less than 180 g, but not more than 250 g, more preferably not more than 240 g.

In the following embodiments, the metal member 1A is a head main body 1A provided with an opening O in its crown portion corresponding to the crown portion 4, and the resin member 1B is a crown member 1B closing the opening O so that the mass of the crown portion 4 is reduced. The reduce mass can be added to a lower portion and/or a rear portion of the head to adjust the center of gravity of the head and/or the moment of inertia of the head or can be utilized to increase the size of the head. Thus, the design freedom is increased.

Figure 2:
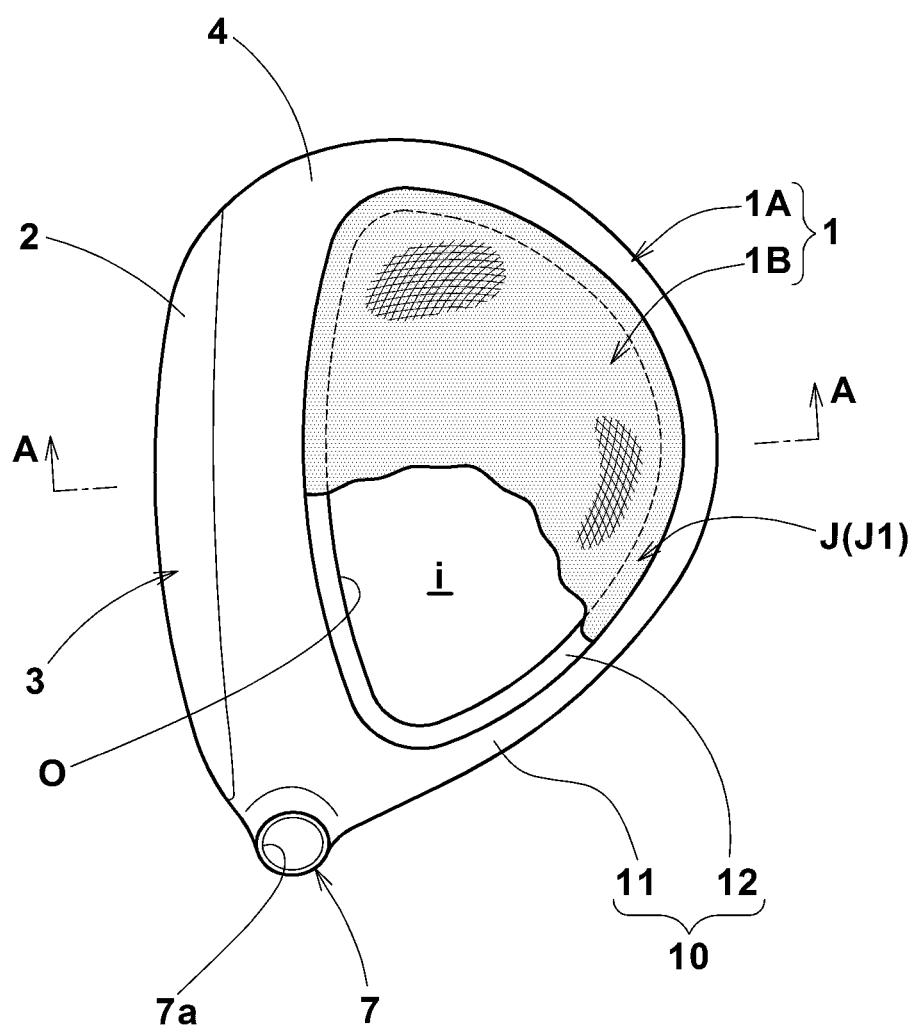
FIG. 2 is a top view thereof.
Figure 4:
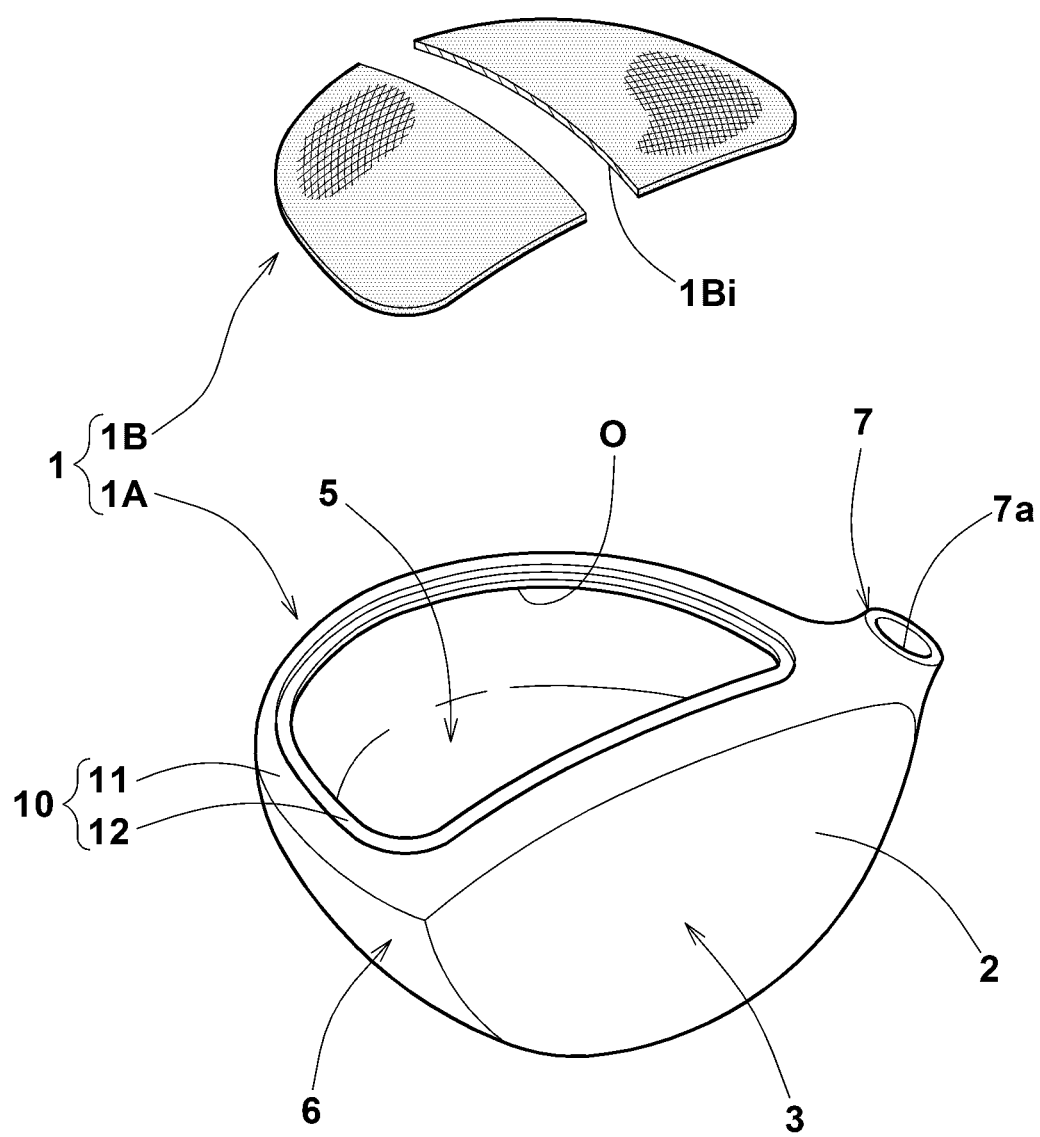
FIG. 4 is an exploded view of the head.
Figure 6:
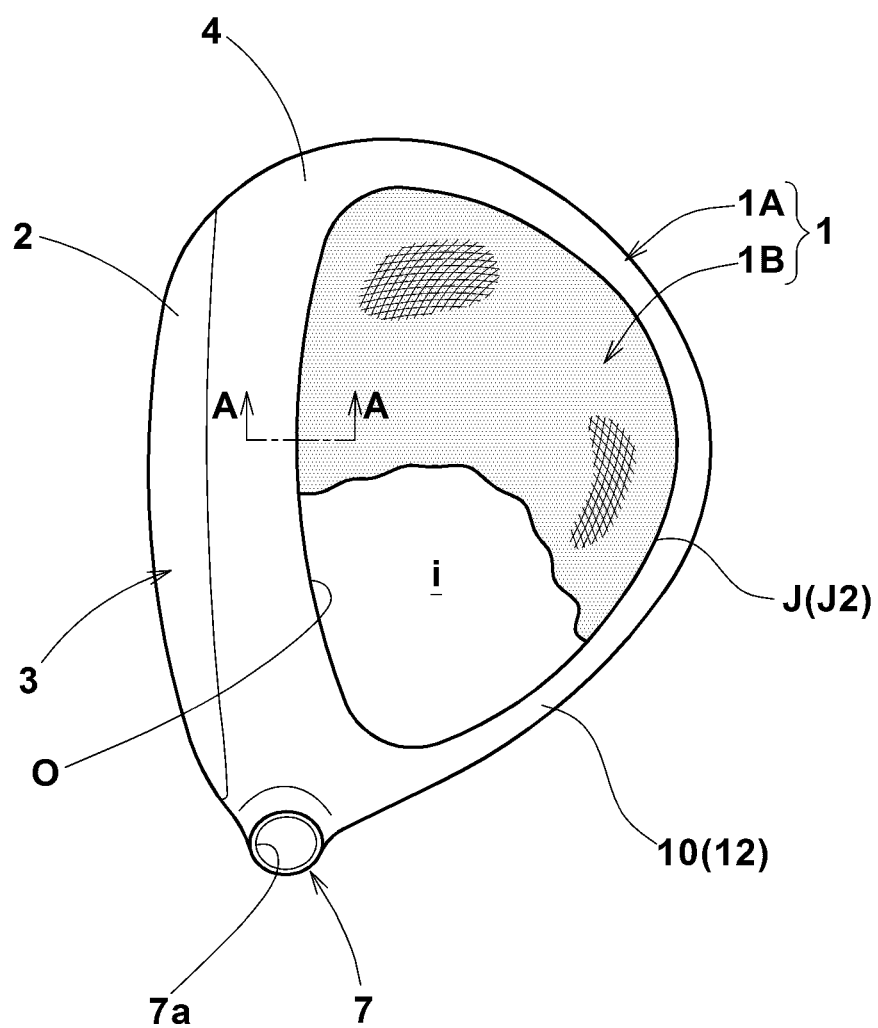
FIG. 6 is a top view of a golf club head as another embodiment of the present invention.

As shown in FIGS. 2, 4 and 6, the opening O is formed within the crown portion 4, namely, without extending into the side portion 6. Therefore, the head main body 1A forms the face portion 3, the sole portion 5, the side portion 6, the hosel portion 7 and a crown peripheral part 10 which is a part of the crown portion 4 extending around the opening O.

The contour of the crown member 1B is almost same as or slightly smaller than the contour of the opening O.

The thickness tc of the crown member 1B is not less than 0.3 mm, preferably not less than 0.5 mm, more preferably not less than 1.0 mm to avoid difficulty in the welding, but not more than 4.0 mm, preferably not more than 3.5 mm, more preferably not more than 3.0 mm to avoid an unfavorable weight increase at the upper part of the head.

The head main body 1A may be manufactured as one integrated piece through a casting technique. Further, it can be manufactured by assembling two or more members manufactured through appropriate techniques such as forging, casting, pressing and rolling.

As to the metal material, various metal materials, e.g. stainless steel, maraging steel, pure titanium, titanium alloy and the like may be used.

As to the resin material, a composite material of a resin as the matrix and fibers as reinforcement for the resin may be preferably used.

As to the resin as the matrix, various thermoplastic resins may be used as far as excellent adhesive properties are exhibited with respect to the metal material. In particular, the use of a thermoplastic resin whose laser transmission factor is 60% or more is most desirable. For example, polyamide, polycarbonate, polyethylene terephthalate and the like may be used as a thermoplastic resin with such high laser transmission.

As to the reinforcing fibers, various fibers may be used. For example, carbon fibers, glass fibers and the like may be used alone or in combination.

The specific gravity of the resin material is less than that of the metal material.

According to the present invention, the resin member or crown member 1B is laser welded to the metal member or head main body 1A.

Figure 3:
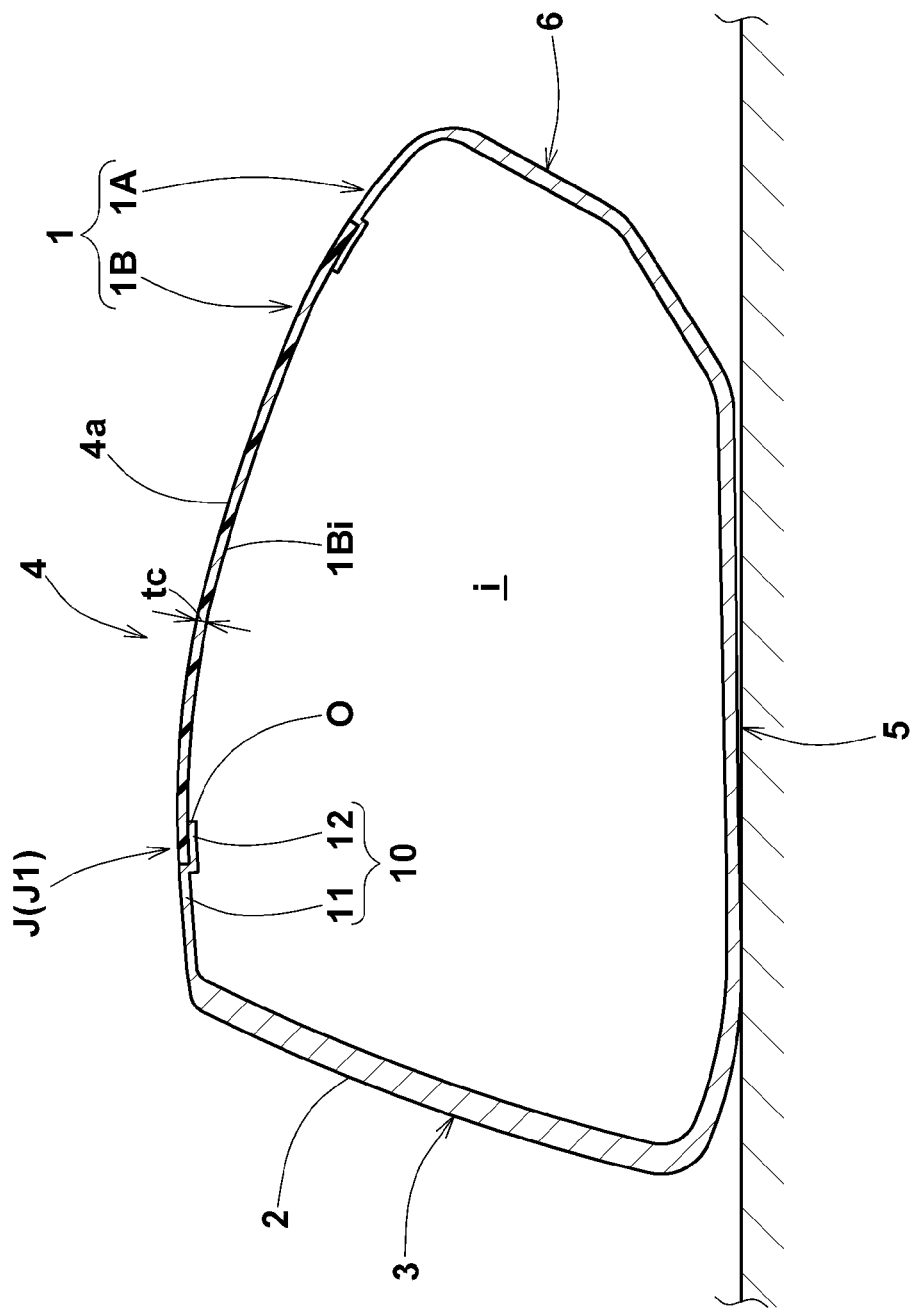
FIG. 3 is a cross sectional view of the head taken along line A-A of FIG. 2.

In the embodiment shown in FIGS. 1, 2 and 3, the crown peripheral part 10 comprises
a main part 11 of which outer surface defines a part of the outer surface 4a of the crown portion 4, and
a receiving part 12 of which outer surface is stepped inward from the outer surface of the main part 11.
The receiving part 12 may be formed discontinuously along the edge of the opening O. But in this embodiment, the receiving part 12 are formed continuously around the opening O. Thus, the receiving part 12 protrudes into the opening O from the edge of the opening O.

When the crown member 1B is fitted in the opening O, the outer surface of the receiving part 12 abuts on and receives a peripheral part of the inner surface 1Bi of the crown member 1B.

In order that the outer surface of the fitted crown member 1B and the outer surface of the main part 11 become level to save the surface-finishing process such as grinding and thereby to improve the production efficiency, the step between the outer surface of the main part 11 and the outer surface of receiving part 12 is set to be substantially equal to the thickness of the peripheral edge part of the crown member 1B.

In a state of the crown member 1B placed on the receiving part 12, the welding is carried out.

Figure 5A:
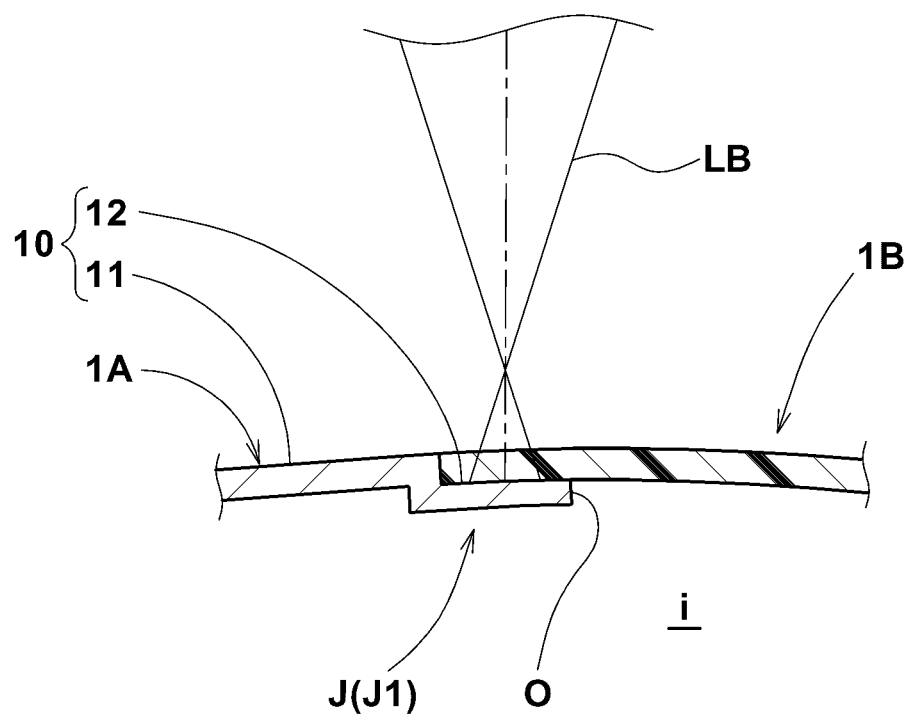
FIG. 5A is a cross sectional view of a joint between the head main body and the crown member for explaining the welding of the crown member and the head main body.

If the laser transmission factor of the crown member 1B is 60% or more, the laser beam LB can be irradiated onto the receiving part 12 from the outer surface side of the club head 1 through the crown member as shown in FIG. 5A.

The laser beam LB is moved along the welding part at a predetermined moving speed.

Figure 5B:
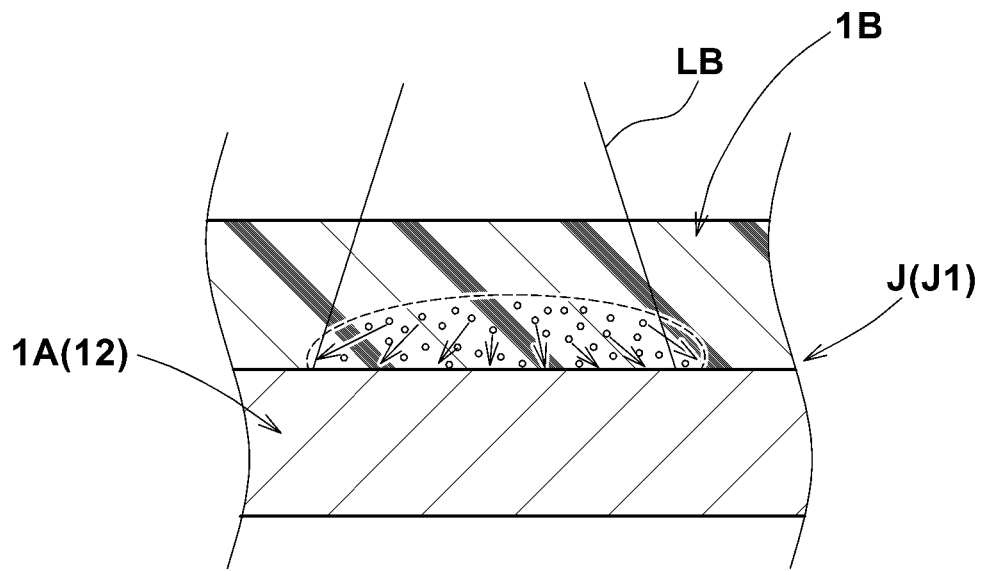
FIG. 5B is a cross sectional view of a joint between the resin member and the metal member for explaining the effects of the laser welding.

Therefore, the laser beam LB heats the metal material of the receiving part 12. The heated metal material heats and melts an inner surface side of the crown member 1B, and the molten part becomes flowable. The molten part is further heated up beyond the temperature of decomposition of the resin so that bubbles are caused therein as shown in FIG. 5B. Due to the expansion of the molten resin caused by the bubbles, the molten resin flows along the surface of the receiving part 12 and closely contacts with the surface of the receiving part 12. Then, the welding part is cooled and the resin is solidified, and thereby a strong interfacial bond on a nano-scale or atomic-scale is provided between the head main body 1A and the crown member 1B.

Thus, in the golf club head according to the present invention, the bonding strength between the metal member 1A and resin member 1B becomes very high and the joint becomes durable.

According to the present invention, no adhesive agent is used to connect the resin member 1B to the metal member 1A. Therefore, the emission of a volatile organic compound usually contained in the adhesive agent can be prevented. Further, a quick bonding is possible, therefore, the production efficiency may be improved.

As to the laser beam LB, for example, a semiconductor laser at about 0.8 to 1.0 micrometers, a YAG laser at about 1.06 micrometers and the like can be used.

In the case that the laser beam LB is irradiated through the resin member whose laser transmission factor is 60% or more, the laser welding is preferably carried out under the following conditions: the laser power is about 50 to 1500 w; the welding speed or the moving speed of the laser beam is 5 to 60 mm/s; the defocus of the laser beam is 0 to 40 mm; and the shielding gas is argon gas, nitrogen gas or the like (flow rate 40 to 50 l/min).

In the case of the resin member whose laser transmission factor is less than 60%, in particular almost zero, in order to heat the crown member 1B, the laser beam LB is irradiated onto the receiving part 12 not through the crown member for example from the inner surface side of the club head 1.

In this case, for example, the laser power is 2000 W or more; the defocus of the laser beam is 0 mm; the welding speed or the moving speed of the laser beam is 10 mm/s; and the shielding gas is nitrogen gas (flow rate 40 to 50 l/min).

In the example shown in FIGS. 3, 4 and 5, the joint J between the metal member 1A (receiving part 12) and the resin member 1B (crown member) is formed as a lapped joint J1.

In order to decrease the mass or volume of the metal material included in the joint J (namely, the receiving part 12), the joint J can be formed as a butt joint J2 instead of the lapped joint J1. Here, the thickness of the lapped joint J1 is substantially equal to the sum of the thicknesses of the metal member and the resin member measured outside the joint. The thickness of the butt joint J2 is substantially equal to the thickness of the metal member or the resin member measured outside the joint.

FIG. 6 shows a club head 1 as another embodiment of the present invention, which is the same as the former embodiment except that the joint J is formed as a butt joint J2, wherein the edge face 1BE of the resin member 1B and the edge face 10E of the metal member 1A are butted with each other.

In this embodiment, the above-mentioned receiving part 12 is omitted, therefore, the crown peripheral part 10 of the head main body 1A is constructed by the main part 11 only. Accordingly, the mass of the club head 1 is reduced in its upper part and thereby the position of the center of gravity of the head can be lowered.

Examples of the butt joint J2, which can be incorporated in this embodiment, are shown in FIGS. 7, 8, 9 and 10A-10c.

Figure 7:
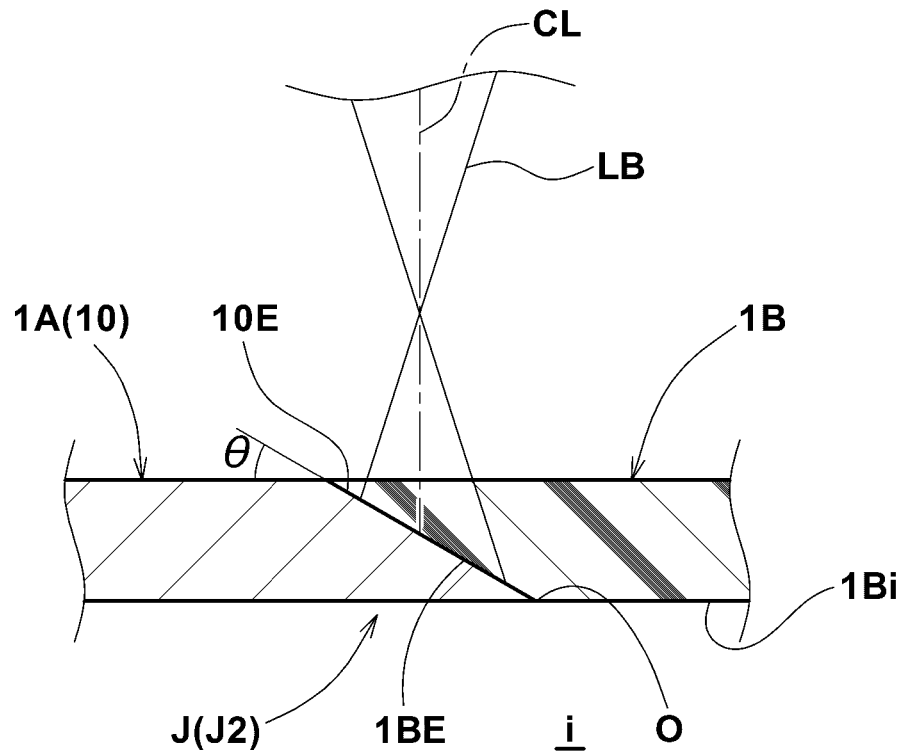
FIG. 7 is a cross sectional view of a joint thereof taken along line A-A of FIG. 6.

In the example shown in FIG. 7, the edge face 10E which is of the main part 11 is inclined to the opening O toward the inside of the club head 1 from the outside of the club head 1. Correspondingly, the edge face 1BE of the crown member 1B is also inclined so as to fit with the edge face 10E.

The crown member 1B can be placed on the edge face 10E of the crown peripheral part 10 of the head main body 1A in preparation for the welding operation. On this occasion, the inclined edge face 10E helps to make an accurate positioning of the crown member 1B.

In such state of the crown member 1B, the laser welding is carried out.

If the laser transmission factor of the crown member 1B is 60% or more, the laser beam LB can be irradiated onto the edge face 10E of the crown peripheral part 10 from the outer surface side of the club head 1 through the crown member. Therefore, the edge face 10E and the edge face 1BE are welded in the same manner as explained above in connection with FIGS. 5A and 5B, and the butt joint J2 so called "bevel joint" is formed.

Unlike the depiction in FIG. 7, the axis CL of the laser beam LB may be set at substantially 90 degrees with respect to the edge face 10E.

Figure 8:
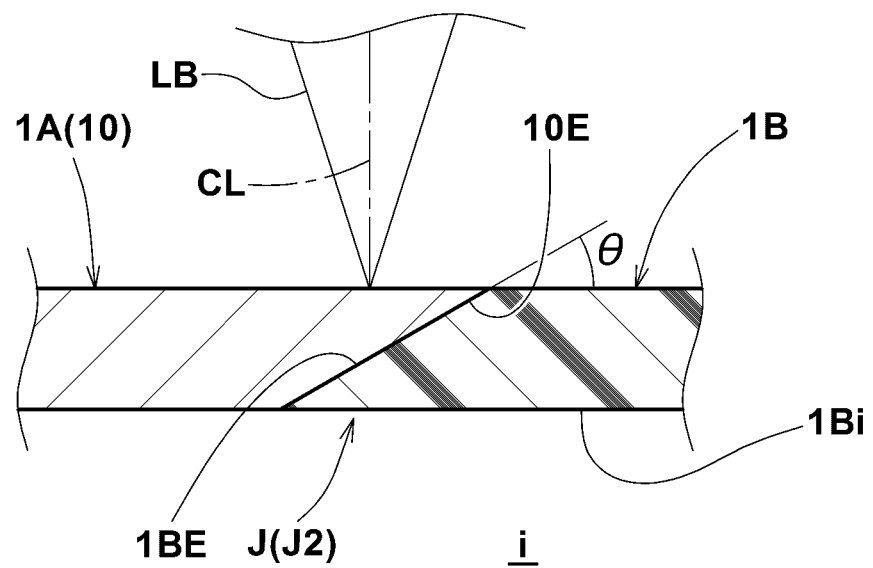
FIG. 8, FIG. 9 and FIGS. 10A-10c are cross sectional views each showing another example of the joint between the resin member and the metal member.

FIG. 8 shows show another example of the butt joint J2. In this example, the edge face 10E which is of the main part 11 is inclined to the opening O toward the outside of the club head 1 from the inside of the club head 1. Correspondingly, the edge face 1BE of the crown member 1B is also inclined so as to fit with the edge face 10E.

The laser beam LB can be irradiated onto the outer surface of the crown peripheral part 10, opposite to the edge face 10E, from the outside of the head main body 1A.

In such a case that the laser transmission factor of the crown member 1B is high and the laser beam LB is to be irradiated on the edge face 10E through the crown member 1B, by utilizing another opening (not shown) formed in a sole side of the head main body 1A, it becomes possible that the crown member 1B is set in the hollow (i) of the head main body 1A and fitted in the opening O and the laser beam LB is irradiated from the inside.

If the head main body 1A is placed upside down, the crown member 1B can be easily placed on the edge face 10E of the crown peripheral part 10.

In this example too, the butt joint J2 so called "bevel joint" is formed.

In the examples of the butt joint J2 shown in FIG. 7 and FIG. 8, the inclination angle θ of the edge face 10E defined by the acute angle formed between the edge face 10E and the outer surface of the club head 1 is set in a range of from 5 to 30 degrees, preferably 7 to 15 degrees.

Figure 9:
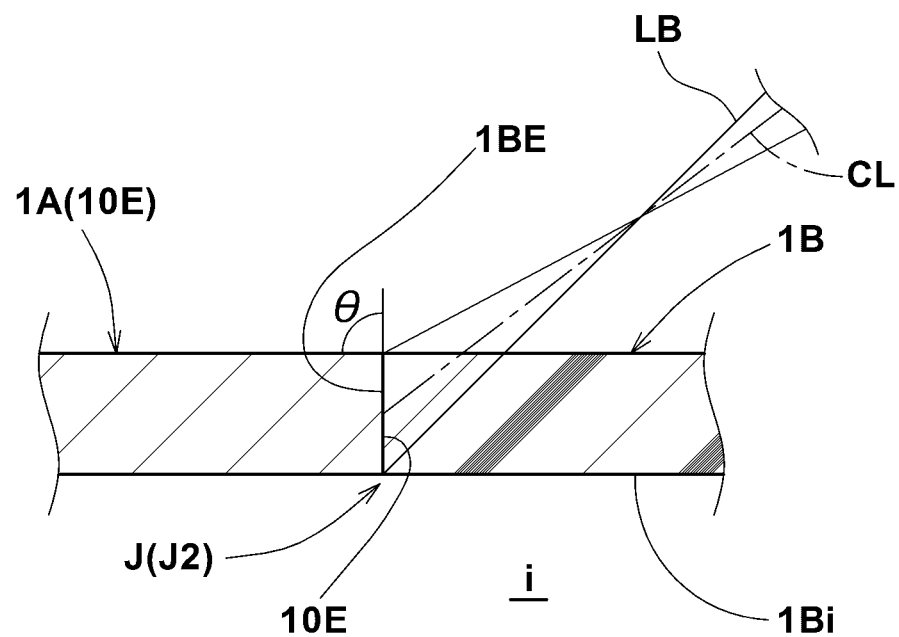

FIG. 9 shows another example of the butt joint J2. In this example, the edge faces 10E and 1BE are substantially perpendicular to the outer surface of the club head.

In the cross section perpendicular to the outer surface of the club head, the edge faces 10E and 1BE are straight.

In this example, the laser beam LB is obliquely irradiated on the edge face 10E through the resin member for example.

As a further example of the butt joint 32, it is also possible to employ the so called "shiplap joint" in which, in the cross section perpendicular to the outer surface of the club head, the edge faces 10E and 1BE are formed zigzag lines to engage with each other, each zigzag line made up of three segments: a mid segment extending parallel with the outer surface of the club head; and two segments extending from both ends of the mid segment oppositely to each other and perpendicularly to the outer surface of the club head.

Figure 10A:
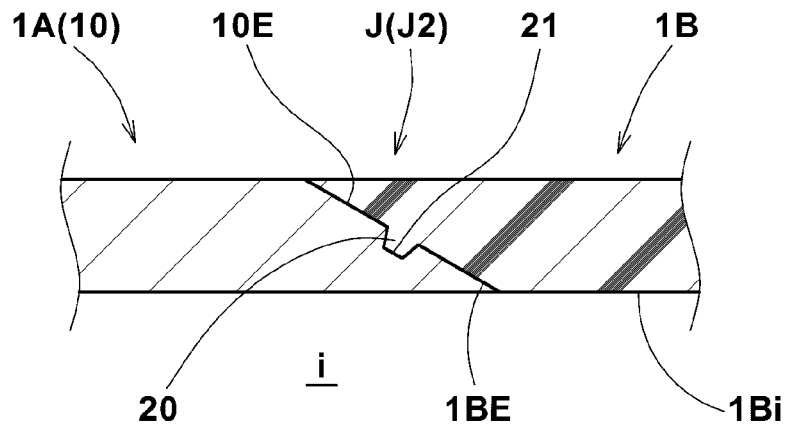
Figure 10B:
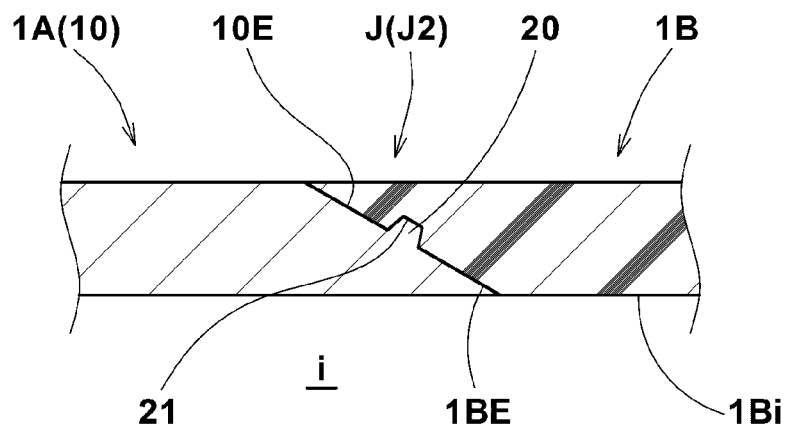
Figure 10C:
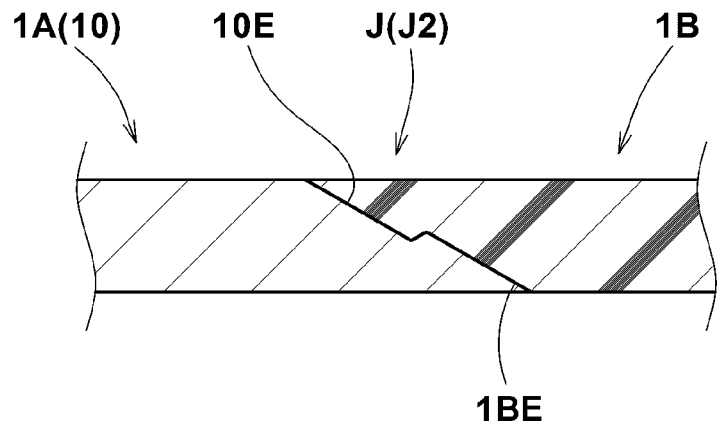

FIGS. 10A, 10B and 10c show further examples of the butt joint 32. These examples are modifications of the "bevel joint" shown in FIGS. 7 and 8, in particular FIG. 7.

In FIGS. 10A and 10B, the difference from the former examples is that one of the edge faces 10E and 1BE is provided with a depression 21, and the other is provided with a projection 20 to fit into the depression 21.

The projection 20 and the depression 21 may be continuous or discontinuous along the edge of the opening O. The discontinuous projection 20 may be formed like a number of pins.

Owing to the engagement of the projection 20 and depression 21, the bonding strength may be increased. Further, the positioning becomes easier.

In FIG. 10c, the difference from the former examples is that, in the cross section perpendicular to the outer surface of the club head, the edge faces 10E and 1BE are formed zigzag so as to engage each other. This type of butt joint J2 is called "hooked scarf joint".

In any case, after the weld joint J is formed, at least the outer surface of the weld joint J may be polished. Further, the outer surface of the head may be coated with a colored paint or the like to form a hard coat.

As described above, in the above-mentioned embodiments, the metal member 1A and resin member 1B are the head main body 1A and the crown member 1B, respectively.

But, the metal member can be formed as various members, for example, a member forming one or more of the face portion 3, sole portion 5, side portion 6 and hosel portion 7, and further a weight member and the like.

The resin member can be formed as various members, for example, a member forming the sole portion 5, a member forming the side portion 6, a member forming the crown portion 4 and side portion 6 and the like.

In the above-mentioned embodiments, the metal member 1A forms the most part of the golf club head. But, it is also possible to apply the present invention to a golf club head such that the resin member or members (inclusive of fiber reinforced resin member) forms the most part of the golf club head.

Aside from the wood-type golf club heads, the present invention can be applied to iron-type, utility-type and patter-type golf club heads.

Comparison Tests

For each of the following club heads having different joint structures, the moment of inertia of the head about a vertical axis passing through the center of gravity of the head was computed by the use of a computer.

Figure 11:
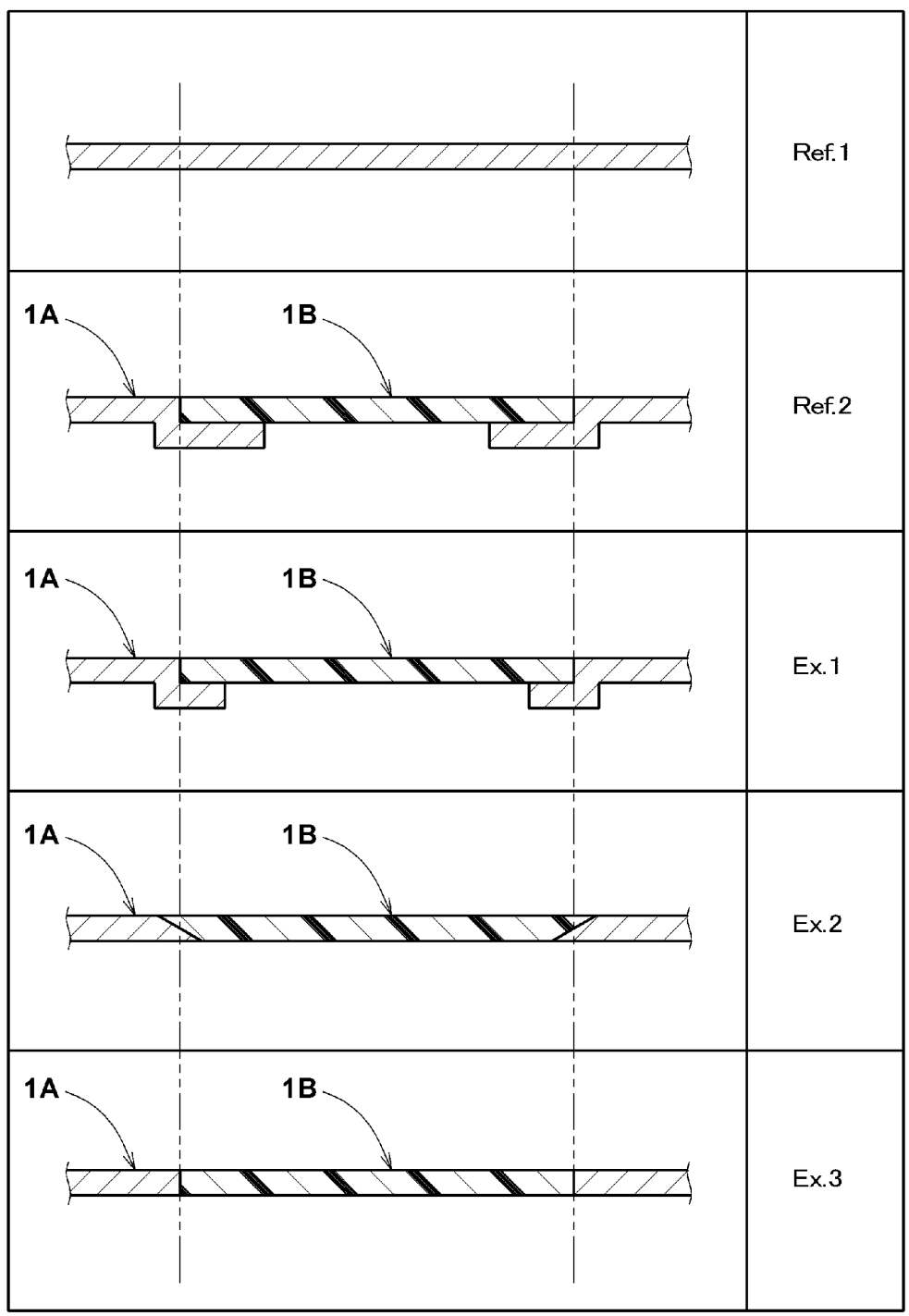
FIG. 11 is a table showing joint structures employed in the undermentioned comparison tests.

The results are shown in Table 1, and the respective joint structures are schematically show in FIG. 11.

Embodiments Ex. 1 and Ex. 2

Embodiment Ex. 1 corresponded to the golf club head shown in FIGS. 1-3. Embodiment Ex. 2 corresponded to the golf club head shown in FIGS. 6-7. Except for the joint structure, Embodiment Ex. 1 is the same as Embodiment Ex. 2 inclusive of the mass of the crown member. The head main body was made of a titanium alloy. The crown member was a molded part of a carbon fiber reinforced resin.

Embodiment Ex. 3

Embodiment Ex. 3 corresponded to the golf club head having the joint shown in FIG. 9. Except for the joint structure, Embodiment Ex. 3 is the same as Embodiment Ex. 1 inclusive of the mass of the crown member.

Comparative Example Ref. 1

Comparative example Ref. 1 was the same as Embodiment Ex. 3 except that the crown member was made of a titanium alloy. The total mass of the club head was 192.7 grams.

Comparative Example Ref. 2

Comparative example Ref. 2 was the same as Embodiment Ex. 1 except that the crown member was connected to the head main body by the use of an adhesive agent, and the receiving part had a wider width than Embodiment Ex. 1 and a 1.6 gram heavier mass than Embodiment Ex. 1.

To adjust the total mass of the head to the same value, weight members were added as follows.

The crown portion of comparative example Ref. 2 became 5.2 gram lighter than that of Comparative example Ref. 1. Therefore, a weight member of 5.2 grams was fixed to the backmost position of the club head in the side portion.

Embodiment Ex. 1 became 1.6 gram lighter than Comparative example Ref. 2 in the receiving part. Therefore, a weight member of (1.6+5.2=) 6.8 grams was fixed to the backmost position of the club head in the side portion.

Embodiment Ex. 2 and Embodiment Ex. 3 became 5.4 gram lighter than comparative example Ref. 2. Therefore, a weight member of (5.4+5.2=) 10.6 grams was fixed to the backmost position of the club head in the side portion.

TABLE 1

| Club Head | Ref. 1 | Ref. 2 | Ex. 1 | Ex. 2 | Ex. 3 |
|---|---|---|---|---|---|
| total mass of club head (g) | 192.7 | 192.7 | 192.7 | 192.7 | 192.7 |
| mass of receiving part (g) | 0 | 5.4 | 3.8 | 0 | 0 |
| mass of added weight member (g) | 0 | 5.2 | 6.8 | 10.6 | 10.6 |
| moment of inertia (g sq. cm) | 4216 | 4381 | 4418 | 4497 | 4497 |

From the test results, it is apparent that the club heads according to the present invention can be increased in the mass of the additional weight member, without increasing the total mass of the head, owing to the reduced mass of the receiving part or the omitted receiving part, and thereby the moment of inertia can be increased.

The invention claimed is:

1. A method for manufacturing a golf club head having a hollow structure comprising a metal member made of a metal material and a resin member made of a resin material, said method comprising the steps of:
    making the metal member including a crown portion provided with an opening;
    making the resin member for closing the opening;
    fitting the resin member to the opening of the metal member so that the resin member and the metal member have mutually-contacting surfaces;
    heating the metal member by irradiating the contacting surface of the metal member with a laser beam through the resin material or irradiating a vicinity of the contacting surface of the metal member with a laser beam not through the resin material;
    melting the resin material of the resin member by the heated metal member; and
    welding the resin member to the metal member by cooling and hardening the molten resin material.

2. The method according to claim 1, wherein the resin member is reinforced with fibers.

3. The method according to claim 1, wherein in a weld joint between the metal member and the resin member, edge portions of the metal member and the resin member are overlapped one upon the other.

4. The method according to claim 1, wherein in a weld joint between the metal member and the resin member, edge portions of the metal member and the resin member are butted with each other.

5. The method according to claim 4, wherein one of the edge faces of the metal member and the resin member is provided with a depression, and the other is provided with a projection fitting into the depression.

6. The method according to claim 1, wherein in a cross section of the weld joint, the butted edge faces, extend in the thickness direction of the weld joint, or are inclined with respect to the thickness direction of the weld joint, or extend zigzag.

7. The method according to claim 1, wherein the heating is achieved by irradiating the metal member with the laser beam through the resin material.

8. The method according to claim 1, wherein the heating is achieved by irradiating the metal member with the laser beam not through the resin material.

9. The method according to claim 1, wherein the molten resin material is heated to a temperature higher than the decomposition temperature of the matrix resin so that bubbles are caused therein.

10. A method for manufacturing a golf club head, the golf club head having a hollow structure comprising a metal member made of a metal material and provided with an opening and a resin member made of a resin material and closing the opening, said method comprising:
- preparing the resin member having a thickness of no less than 0.3 mm and not more than 4.0 mm so that an edge surface of the resin member is inclined to the opening toward the inside from the outside of the club head or, alternatively, toward the outside from the inside of the club head;
- preparing the metal member so that an edge surface of the opening is inclined to fit with said inclined edge surface of the resin member;
- setting the resin member in the opening of the metal member so that the inclined edge surface of the resin member fits with the inclined edge surface of the opening;
- irradiating a vicinity of the inclined edge surface of the opening of the metal member with a laser beam so that the inclined edges surface of the opening is heated,
- melting the resin material adjacent to the inclined edge surface of the resin member by the heated inclined edge surface of the opening of the metal member, and
- welding the inclined edge surface of the resin member to the inclined edge surface of the opening of the metal member by cooling and hardening the molten resin material so as to form a weld joint therebetween.

11. The method according to claim 10, wherein the thickness of the resin member in the vicinity of the edge surface of the resin member is substantially the same as the thickness of the metal member in the vicinity of the edge surface of the metal member.

12. The method according to claim 10, wherein in a cross section of the weld joint, the inclined edge surfaces are substantially straight.

13. The method according to claim 10, wherein in a cross section of the weld joint, the inclined edge surfaces are zigzag.

14. The method according to claim 10, wherein in a cross section of the weld joint, one of the inclined edge surfaces is provided with a depression, and the other is provided with a projection into the depression.

\* \* \* \* \*